United States Patent
Mese et al.

(10) Patent No.: US 9,959,187 B2
(45) Date of Patent: May 1, 2018

(54) DECOALESCING RESOURCE UTILIZATION AT BOOT

(71) Applicant: Lenovo (Singapore) Pte. Ltd., Singapore (SG)

(72) Inventors: John Carl Mese, Cary, NC (US); Joshua Neil Novak, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 320 days.

(21) Appl. No.: 14/261,741

(22) Filed: Apr. 25, 2014

(65) Prior Publication Data

US 2015/0309804 A1 Oct. 29, 2015

(51) Int. Cl.
  *G06F 9/44* (2006.01)
  *G06F 11/30* (2006.01)
  *G06F 11/34* (2006.01)

(52) U.S. Cl.
  CPC ........ *G06F 11/302* (2013.01); *G06F 9/4401* (2013.01); *G06F 11/3051* (2013.01); *G06F 11/3433* (2013.01); *G06F 2201/865* (2013.01)

(58) Field of Classification Search
  CPC .... G06F 9/4401; G06F 9/4406; G06F 11/302; G06F 11/3003
  See application file for complete search history.

(56) References Cited

U.S. PATENT DOCUMENTS

| | | | | |
|---|---|---|---|---|
| 7,243,245 B2 * | 7/2007 | Pagan | ........... | G06F 9/4406 713/1 |
| 7,299,346 B1 * | 11/2007 | Hollis | ........... | G06F 9/4401 713/1 |
| 7,702,891 B1 * | 4/2010 | Nazarov | ........... | G06F 9/445 713/1 |
| 8,370,613 B1 * | 2/2013 | Manadhata | ........... | G06F 9/4401 713/2 |
| 8,752,038 B1 * | 6/2014 | Newstadt | ........... | G06F 9/4401 713/2 |
| 2001/0047472 A1 * | 11/2001 | Huntington | ........... | G06F 9/4406 713/2 |
| 2003/0023844 A1 * | 1/2003 | Combe | ........... | G06F 9/4401 713/2 |
| 2007/0016324 A1 * | 1/2007 | Oddiraju | ........... | G06F 9/4401 700/174 |
| 2007/0038850 A1 * | 2/2007 | Matthews | ........... | G06F 9/4401 713/1 |
| 2007/0121665 A1 * | 5/2007 | Ergan | ........... | G06F 9/4401 370/455 |
| 2007/0162732 A1 * | 7/2007 | Diwan | ........... | G06F 11/3419 713/1 |
| 2007/0174604 A1 * | 7/2007 | Wang | ........... | G06F 11/2289 713/2 |
| 2009/0063837 A1 * | 3/2009 | Shayer | ........... | G06F 9/4401 713/2 |

\* cited by examiner

*Primary Examiner* — Thomas Lee
*Assistant Examiner* — Gary Collins
(74) *Attorney, Agent, or Firm* — Ference & Associates LLC

(57) ABSTRACT

An embodiment provides a method, including: in a system, determining a set of processes which run at system boot; monitoring the processes at system boot for system resource utilization; categorizing processes of the set of processes based on said monitoring; and changing a start time during boot of at least one process based on said categorizing. Other aspects are described and claimed.

20 Claims, 4 Drawing Sheets

DECOALESCING RESOURCE UTILIZATION AT BOOT

BACKGROUND

It can be appreciated that when an operating system (OS) is booted for a computer device (e.g., desktop, laptop or tablet), there can be several concurrent demands on system resources; such demands are placed on system resources such as a CPU (central processing unit), system memory and disk I/O (input/output). This can result in undesirable contention for the available, finite system resources and resulting bottlenecks can slow the system down considerably and elongate boot time. This also may prevent a user from freely utilizing the device immediately after boot, until all incoming demands are met.

In addition to the problems mentioned above, for as long as a system ages, additionally installed software may result in even further demands on system resources at boot, thus adding to the already undesirable delays that a user might experience in attempting to use the device after boot.

BRIEF SUMMARY

One aspect provides a method, comprising: in a system, determining a set of processes which run at system boot; monitoring the processes at system boot for system resource utilization; categorizing processes of the set of processes based on said monitoring; and changing a start time during boot of at least one process based on said categorizing.

Another aspect provides a system, comprising: a processor; and a memory that stores instructions executable by the processor to: in a system, determining a set of processes which run at system boot; monitor the processes at system boot for system resource utilization; categorize processes of the set of processes based on said monitoring; and change a start time during boot of at least one process based on said categorizing.

A further aspect provides a product, comprising: a storage device having code stored therewith, the code being executable by a processor and comprising: code that, in a system, determines a set of processes which run at system boot; code that monitors the processes at system boot for system resource utilization; code that categorizes processes of the set of processes based on said monitoring; and code that changes a start time during boot of at least one process based on said categorizing.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
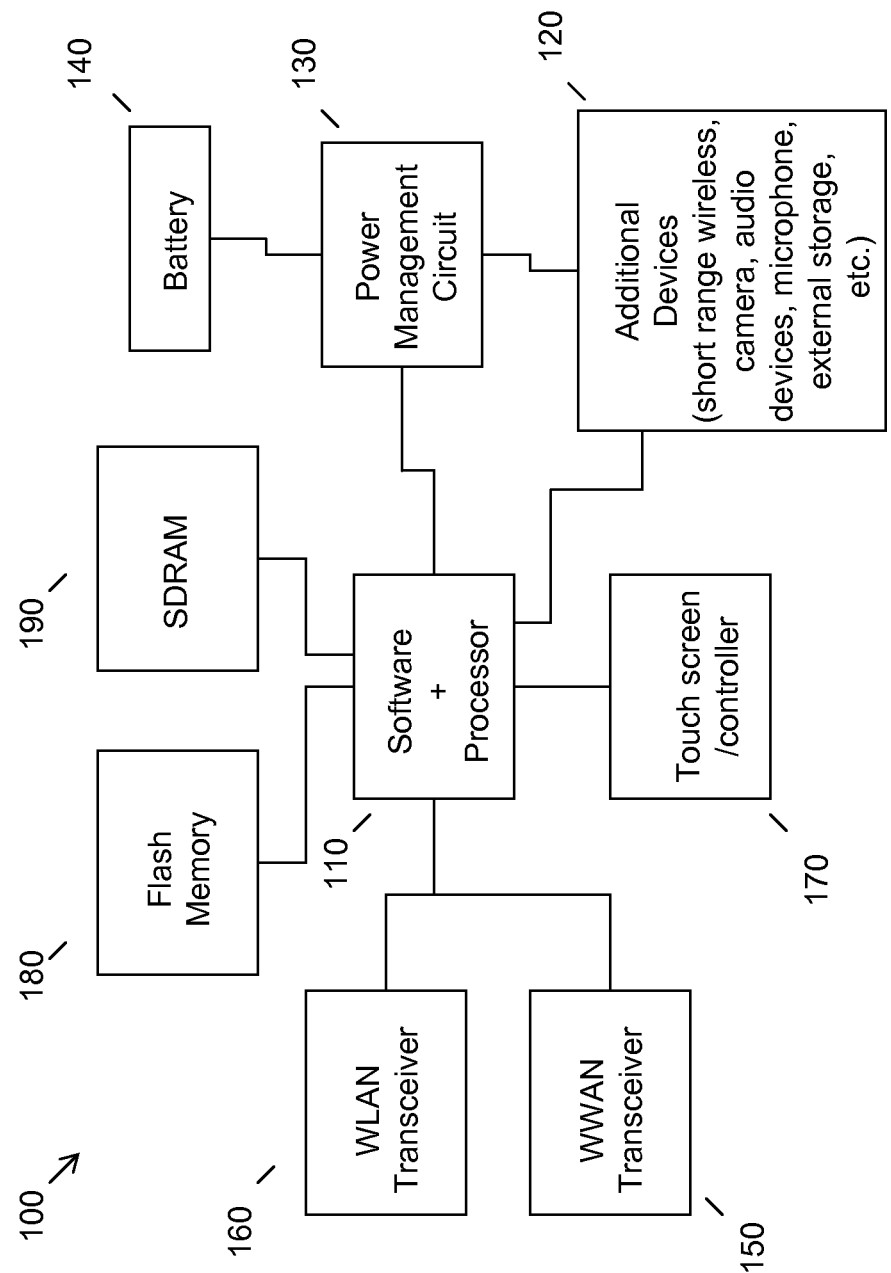
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Current solutions to bottlenecks in system resources at boot time require vendors (e.g., software suppliers) to react to other components installed on a system or to react to resource availability in an attempt to only launch components on-demand or in an event-based fashion; otherwise, the only option may be to prevent startup code from running at all. It is difficult to achieve full coverage for any of the aforementioned solutions given that there is generally a complex system landscape that preferably is initialized at start up or booting of the system.

An embodiment thus provides a dynamic monitoring of the system such that a coordination of processes may be achieved at start up to alleviate potential bottlenecks in system resources during boot. In an embodiment, a scan of all or substantially all locations that the operating system (OS) provides to register items to run at boot is made. By way of example, on a system that includes a WINDOWS OS, this includes the registry, startup folders, and scheduled tasks.

An embodiment captures, using this scan information, a "base snapshot" of the processes that the OS runs at boot time. An embodiment may not attempt or intend to change these items, as they may affect OS operation. This scanning to create a base snapshot may be run during device manufacturing to record the initial state of boot start items.

Next, an embodiment may sort items into time slices or "buckets", e.g., as items are added during manufacturing process or installed by the user, they are sorted into time slice "buckets". This "sorting" results in an improved system boot by virtue of taking into account when a particular item is started, i.e., knowledge of system resource load may be taken into account in this sorting process.

For example, based on previous boot data, including system resource utilization, and a map of all processes run at boot time (and any other processes that might run), an agent builds a model of all the processes set to run at boot. The agent may also monitor each process that runs at boot, e.g., watching for which processes launch interfaces that appear to the user, or may launch other processes that may launch interfaces to the user. The agent may sort all boot processes based on this information using a priority scheme.

An example priority may be as follows. Base OS boot processes are not changed to preserve OS functionality. However, processes that have low resource utilization, with a user interface, may be prioritized slightly over processes that have high resource utilization, with a user interface, which may in turn be prioritized over processes that have low resource utilization, without a user interface, and finally processes that have a high resource utilization, without a user interface may be started last.

An embodiment then may create the necessary number of "buckets" to hold all of these processes and smooth out the resource utilization so that the user is able to use the system immediately after the system boots. Over time, as the user utilizes different programs and installs new ones, an embodiment continues to monitor system boot processes and resort the boot processes as necessary. For example, if too many processes get sorted into the same bucket, then they are adjusted to run at a more opportune time (e.g., delayed or moved up into a different bucket). This modeling prevents guaranteed start times but the de-coalescing smoothes resource utilization, in turn improving end user experience and customer satisfaction. Furthermore, this also guards against slowdown as the system changes with age.

The illustrated example embodiments will be best understood by reference to the figures. The following description is intended only by way of example, and simply illustrates certain example embodiments.

Figure 2:
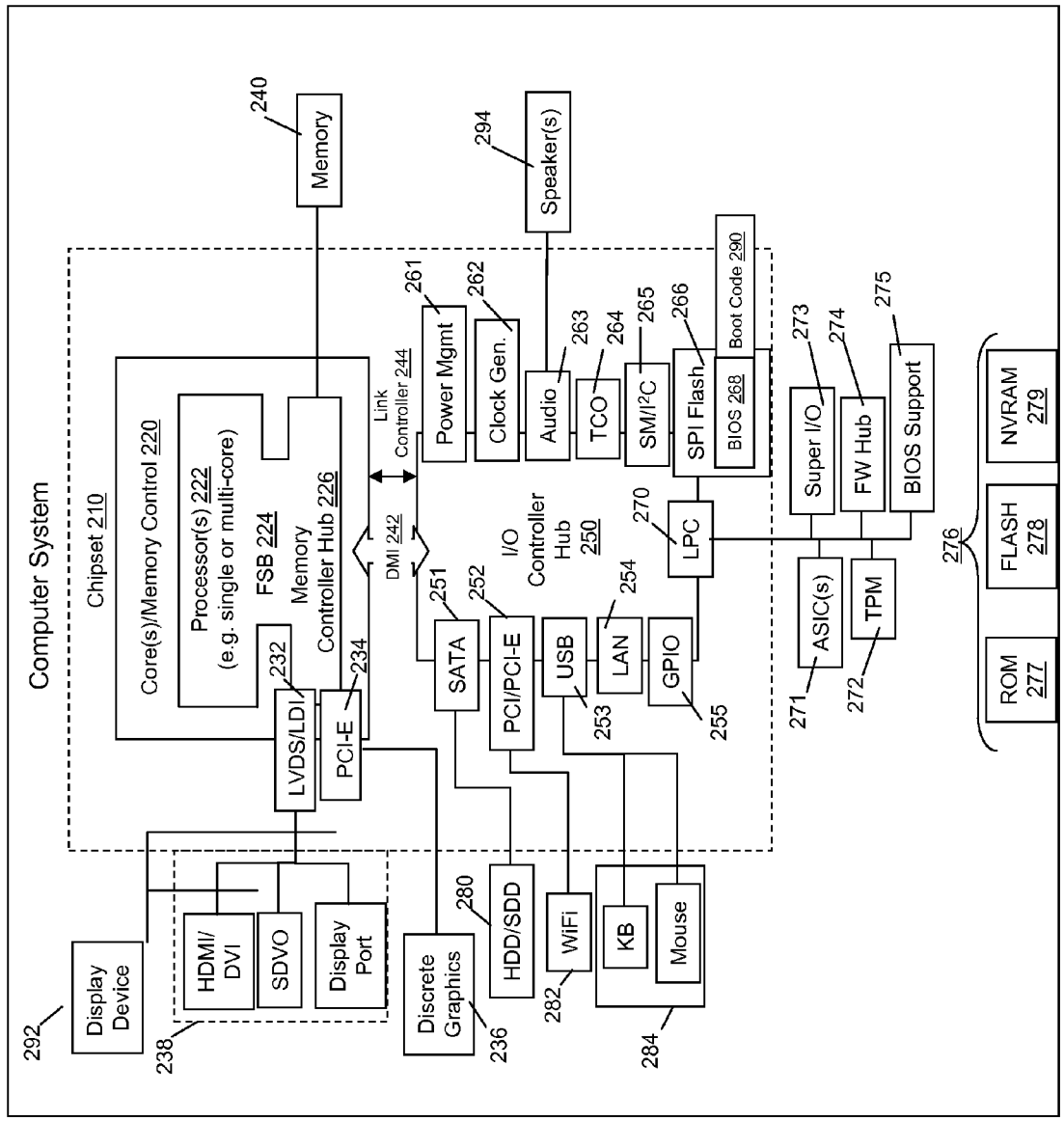
FIG. 2 illustrates another example of an information handling device.

FIGS. 1 and 2 relate to electronic components that may be included in mobile computing platforms and/or laptop computers. It should be understood and appreciated that components illustrated and described with respect to FIGS. 1 and 2, and aspects of the circuitry involved, may also be found and utilized in desktop computer systems and/or CPUs thereof, which themselves may serve as a context for embodiments as broadly contemplated herein.

While various other circuits, circuitry or components may be utilized in information handling devices, an example illustrated in FIG. 1 includes a system design found for example in tablet or other mobile computing platforms. Software and processor(s) are combined in a single unit 110. Internal busses and the like depend on different vendors, but essentially all the peripheral devices (120) may attach to a single unit 110. The circuitry 100 combines the processor, memory control, and I/O controller hub all into a single unit 110. Also, systems 100 of this type do not typically use SATA or PCI or LPC. Common interfaces for example include SDIO and I2C.

There are power management circuits(s) 130, e.g., a battery management unit, BMU, which manage power as supplied for example via a rechargeable battery 140, which may be recharged by a connection to a power source (not shown). In at least one design, a single unit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are also commonly included. Commonly, system 100 will include a touch screen/controller 170 for data input and display. System 100 also typically includes various memory devices, for example flash memory 180 and SDRAM 190.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a set 210 (a group of integrated circuits, or chips, that work together) with an architecture that may vary depending on manufacturer (for example, INTEL, AMD, ARM, etc.). INTEL is a registered trademark of Intel Corporation in the United States and other jurisdictions. AMD is a registered trademark of Advanced Micro Devices, Inc. in the United States and other jurisdictions. ARM is a trademark of ARM Holdings plc in various jurisdictions.

The architecture of the set 210 includes a core and memory control group 220 and an I/O controller hub 250 that exchanges information (for example, data, signals, commands, et cetera) via a direct management interface (DMI) 242 or a link controller 244. In FIG. 2, the DMI 242 is an interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a unit that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280, etc.), a PCI-E interface 252 (for example, for wireless connections 282), a USB interface 253 (for example, for devices 284 such as a digitizer, keyboard, mice, cameras, phones, microphones, sensors, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

In the context of booting problems discussed heretofore, conventional solutions have involved ad-hoc or stopgap measures to reduce the immediate demands on a device at boot. This often presents a disadvantage of preventing certain programs or functions from being fully implemented at boot, to a point of compromising a significant degree of utility or functionality for the user. Other disadvantages may involve a degree of accommodation or re-working on the part of software vendors that may prove to be cumbersome or functionally questionable.

Thus, conventional solutions for addressing limited resource utilization at boot have involved re-working software so that it may more readily accommodate, or react to, other installed software or general resource availability, or forcing a launch of components only on demand or on an event-based basis. In some cases, startup code is prevented from running at all in order to mitigate demands on system resources. These solutions do little if anything to enhance system functionality from the user's perspective.

Generally, in an embodiment, it is recognized that an OS provides several locations for registering various items to run at boot. Such items can include, but are not necessarily limited to, startup folders, scheduled tasks, and launching a process from registry.

In an embodiment, a base "snapshot" is thus captured of processes that an OS runs at boot time. Since, at the risk of affecting OS operation, such processes should not be altered in any manner, capturing the "snapshot" can take place during device manufacture for those items that are then present; an initial state of items run at boot time can thereby be recorded.

Figure 3:
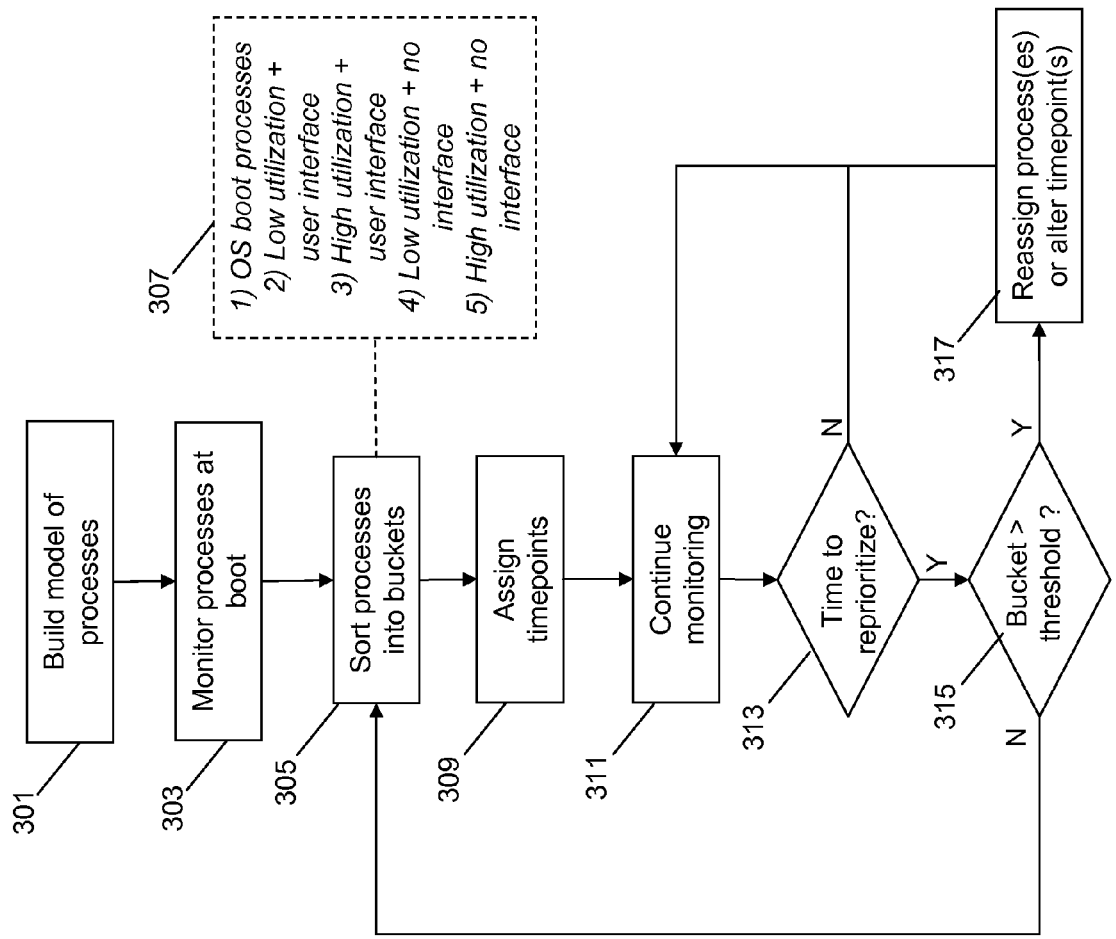
FIG. 3 illustrates a method for sorting boot processes into categories or "buckets".

In this context, and in an embodiment, as items are thereafter added during manufacture or (e.g., in the case of new software) installed by the user, the items are sorted into "buckets". Such buckets may each be associated with a "time slice" (i.e., a designated timepoint for process launch relative to boot), and sorting may be undertaken in a manner now to be described with respect to the process illustrated schematically in FIG. 3.

Accordingly, in an embodiment, based on previous boot data, on system resource utilization and on a map of all processes run at boot (and of any additional processes that may be run by such processes) a software agent (or program) builds a model of all processes initially set to run at boot (301), e.g., as understood from manufacture of the system. The same agent also serves to monitor each process that runs at an initial boot (303). In the process, the agent determines which processes launch windows or interfaces that appear to the user, or which processes may launch other processes that themselves launch windows or interfaces that appear to the user.

In an embodiment, the aforementioned software agent sorts, or categorizes into "buckets" (or categories), all boot processes based on a predetermined priority (305). Example categories are indicated at 307. Thus, a category at a highest level of priority may include base OS boot processes, with an associated understanding that such processed are not to be altered in any manner. Other categories, in descending level of priority may include: low resource utilization, with a user interface involved; high resource utilization, with a user interface involved; low resource utilization, with no user interface involved; and high resource utilization, with no user interface involved. Thus, relatively lower priority is accorded to processes involving high resource utilization and/or no user interface.

Thereafter, in an embodiment, the software agent manages resource utilization in a manner to tailor demands on the system in such a manner that the user may be able to use the system effectively immediately after system boot, more or less by inviting utilization of those processes that involve low resource utilization and/or provide a user interface. In other words, other than processes necessary for system boot (the category with the highest level of priority, as mentioned above), the agent prioritizes resources such as processes that do not place great demands on the system (thus inviting less of a likelihood of bottlenecking) and are more likely to be employed (e.g., those that do involve a user interface). In an embodiment, sorting involves assigning, for each of the buckets or categories, respective timepoints (relative to system boot) at which the processes of the category launch at boot (309).

In an embodiment, a learning function may be adopted by the agent over time to resort and re-prioritize the boot processes. In other words, rather than a static mapping, an embodiment may dynamically remap the processes to different time slots or buckets given information gathered from previous boots. Particularly, as different programs are used at the system and new ones are installed, the agent continues to monitor (311) the practical impact of utilizing different processes at boot (e.g., via monitoring which processes use user interfaces and/or serve to launch other processes) and thereby can move or add one or more processes to one or more buckets. To this end, at predetermined times or in response to predetermined triggers (313), the agent assimilates new data obtained from further monitoring and seeks to re-sort processes into buckets.

In an embodiment, a provision is made for addressing the possibility of too many processes sorted into one and the same bucket. Particularly, if the software agent determines (315) that a given bucket contains a number of processes that exceeds a given (e.g., numerical or fractional) threshold, then a finer adjustment can be made with respect to such processes. Particularly, using finer-grained criteria (e.g., relative to resource utilization or a degree of utilizing windows or launching other processes), one or more processes may appropriately be moved into a different bucket, or an entirely new bucket may even be created for temporary or even permanent use. In a variant embodiment, one or more processes may be chosen (e.g., randomly or on the basis of a predetermined sequence) to run at a different (e.g., later) time at (or after) boot than might otherwise be designated (317). In the absence of these finer adjustments, the agent may revert to a reassignment of boot processes in accordance with the existing buckets and criteria (305).

While fine-grained or delay-driven solutions, such as those just described, may serve to alter what otherwise may be guaranteed or expected start times (relative to boot) for one or more processes, the general act of decoalescing still serves to smooth resource utilization overall, with attendant advantages for the user in terms of general functionality and utility. Such solutions may also provide a hedge against general slowdown at boot as a system ages, in that a provision can readily be made for an overabundance of processes that might otherwise compete for utilization at boot to the detriment of system performance.

Figure 4:
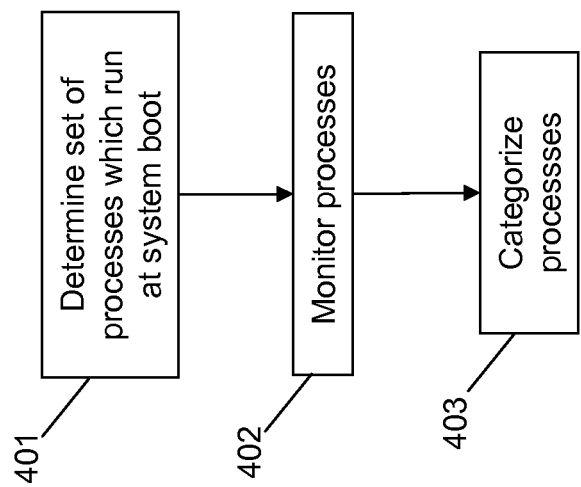
FIG. 4 illustrates an example method of generally managing processes at system boot.

Referring to FIG. 4, a general embodiment may serve to dynamically manage processes at system boot. In a computer system, an embodiment may determine a set of processes which run at system boot (401). An embodiment may monitor the processes (402), and categorize the processes (403) on the basis of this monitoring. The categorizing includes according a relative priority to each of the processes, based at least on said monitoring, such that the processes are characterized in a way that is relevant to system resource usage, overall boot time, and user experience. Given this monitoring at 402, based on the relative priority (which may be changed based on the monitoring), an embodiment associates with each process a timepoint for launch relative to system boot that may be used going forward.

In an embodiment, a user may affect the prioritization of processes. For example, if a user typically launches a SKYPE VOIP application before he or she launches a MICROSOFT LYNC application, then that preference would factor into the prioritization calculation. The identification of this user preference may be accomplished in a variety of ways, for example, tracking a user's history of use of applications, permitting a user to select applications or application categories that are to be prioritized/de-prioritized, a combination of the foregoing, etc. In this way, an embodiment allows the dynamic changing or ordering of application start up times to remain with the user's control.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    in a system, determining a set of processes which run at system boot, wherein the determining comprises identifying base operating system boot processes and non-base operating system boot processes;
    monitoring processes of the set of non-base operating system boot processes at system boot for system resource utilization;
    tracking an order in which a user utilizes two or more of the processes of the set of non-base operating system boot processes during runtime;
    categorizing processes of the set of non-base operating system boot processes based on said monitoring and said tracking, wherein the categorizing comprises, for each of the non-base operating system boot processes, identifying a resource utilization and whether the non-base operating system boot processes launches a user interface, wherein the categorizing comprises categorizing a process that launches a user interface as a higher priority than a process that does not launch a user interface and categorizing a process having a low resource utilization as a higher priority than a process having a high resource utilization; and
    changing a start time during boot of at least one non-base operating system boot process based on said categorizing;
    wherein start order of the set of base operating system boot processes is not changed.

2. The method of claim 1, wherein said categorizing comprises:

according a relative priority to each of the non-base operating system boot processes; and based on the relative priority, associating with each non-base operating system boot process a timepoint for launch relative to system boot.

3. The method of claim 2, wherein said relative priority prioritizes the base operating system boot processes over non-base operating system boot processes with respect to start time to maintain start order of the set of base operating system boot processes.

4. The method of claim 2, wherein said monitoring comprises monitoring, for each non-base operating system boot process, whether a non-base operating system boot process launches a user interface.

5. The method of claim 4, wherein said changing comprises taking into account a relative priority of a non-base operating system boot process which launches a user interface.

6. The method of claim 5, wherein said changing comprises taking into account a relative priority of a non-base operating system boot process with lower system resource utilization.

7. The method of claim 6, wherein said changing comprises taking into account a user preference with respect to a non-base operating system boot process.

8. The method of claim 1, wherein said changing comprises reassigning at least one non-base operating system boot process to a different start time.

9. The method of claim 8, wherein said reassigning is based on system resource usage monitoring during a previous boot.

10. The method of claim 1, wherein said monitoring comprises monitoring the non-base operating system boot processes with respect to at least two system boots.

11. A system, comprising:
a processor; and
a memory that stores instructions executable by the processor to:
in a system, determining a set of processes which run at system boot, wherein the determining comprises identifying base operating system boot processes and non-base operating system boot processes;
monitor processes of the set of non-base operating system boot processes at system boot for system resource utilization;
track an order in which a user utilizes two or more of the processes of the set of non-base operating system boot processes during runtime;
categorize processes of the set of non-base operating system boot processes based on monitoring of said processes and said order in which a user utilizes said two or more of the processes during runtime, wherein the categorizing comprises, for each of the non-base operating system boot processes, identifying a resource utilization and whether the non-base operating system boot processes launches a user interface, wherein to categorize comprises categorizing a process that launches a user interface as a higher priority than a process that does not launch a user interface and categorizing a process having a low resource utilization as a higher priority than a process having a high resource utilization; and
change a start time during boot of at least one non-base operating system boot process based on said categorizing;

wherein start order of the set of base operating system boot processes is not changed.

12. The system of claim 11, wherein to categorize comprises:
according a relative priority to each of the non-base operating system boot processes; and
based on the relative priority, associating with each non-base operating system boot process a timepoint for launch relative to system boot.

13. The system of claim 12, wherein said relative priority prioritizes the base operating system boot processes over non-base operating system boot processes with respect to start time to maintain start order of the set of base operating system boot processes.

14. The system of claim 12, wherein said monitoring comprises monitoring, for each non-base operating system boot process, whether a non-base operating system boot process launches a user interface.

15. The system of claim 14, wherein to change comprises taking into account a relative priority of a non-base operating system boot process which launches a user interface.

16. The system of claim 15, wherein to change comprises taking into account a relative priority of a non-base operating system boot process with lower system resource utilization.

17. The system of claim 16, wherein to change comprises taking into account a user preference with respect to a non-base operating system boot process.

18. The system of claim 11, wherein to change comprises reassigning at least one non-base operating system boot process to a different start time.

19. The system of claim 18, wherein said reassigning is based on system resource usage monitoring during a previous boot.

20. A product, comprising:
a storage device having code stored therewith, the code being executable by a processor and comprising:
code that, in a system, determines a set of processes which run at system boot, wherein the determining comprises identifying base operating system boot processes and non-base operating system boot processes;
code that monitors processes of the set of non-base operating system boot processes at system boot for system resource utilization;
code that tracks an order in which a user utilizes two or more of the processes of the set of non-base operating system boot processes during runtime;
code that categorizes processes of the set of processes based on said code that monitors and said code that tracks, wherein the code that categorizes comprises code that, for each of the non-base operating system boot processes, identifies a resource utilization and whether the non-base operating system boot processes launches a user interface, wherein the code that categorizes comprises code that categorizes a process that launches a user interface as a higher priority than a process that does not launch a user interface and code that categorizes a process having a low resource utilization as a higher priority than a process having a high resource utilization; and
code that changes a start time during boot of at least one non-base operating system boot process based on said categorizing;
wherein start order of the set of base operating system boot processes is not changed.

* * * * *